United States Patent [19]
Brown, II

[11] Patent Number: 5,658,181
[45] Date of Patent: Aug. 19, 1997

[54] DIE AND METHOD FOR APPLYING RADIAL FORCES TO AN ECCENTRIC WORKPIECE

[75] Inventor: Richard A. Brown, II, Long Beach, Calif.

[73] Assignee: Hughes Aircraft Company, Los Angeles, Calif.

[21] Appl. No.: 526,428

[22] Filed: Sep. 11, 1995

[51] Int. Cl.$^6$ .............................. H01J 9/18; B23Q 1/56; B23P 11/00

[52] U.S. Cl. .......................... 445/23; 29/283.5; 29/516; 269/156

[58] Field of Search .................... 445/23, 66; 29/508, 29/516, 283.5; 269/156

[56] References Cited

U.S. PATENT DOCUMENTS

| | | | |
|---|---|---|---|
| 2,586,653 | 2/1952 | Hill | 29/516 |
| 2,822,501 | 2/1958 | Poulter | 445/23 |
| 3,725,992 | 4/1973 | Davis | 29/283.5 |
| 4,403,385 | 9/1983 | Kirk | 29/508 |

FOREIGN PATENT DOCUMENTS 5-205645  8/1993  Japan ........................ 445/23

OTHER PUBLICATIONS

Hansen, James W., editor, *TWT/TWTA Handbook*, Hughes Aircraft Company, Electron Dynamics Division, Torrance, CA, pp. 46–55.

*Primary Examiner*—David L. Pirlot
*Assistant Examiner*—Jeffrey T. Knapp
*Attorney, Agent, or Firm*—Elizabeth E. Leitereg; Terje Gudmestad; Wanda K. Denson-Low

[57] ABSTRACT

A die is disclosed for applying radial force to an eccentric workpiece. The die includes a set of faces that are each inclined from an orthogonal relationship with a different radial plane of the workpiece by an offset angle. The die also includes wedges that are positioned on the faces. They each have a jaw surface and a slide surface that are inclined from a parallel relationship with each other by a wedge angle that equals the offset angle of their respective face. The wedges can move over the faces to abut the workpiece along each of a plurality of transverse planes. In each of these planes, their movement can accommodate the workpiece's eccentricity in that plane. In addition, each jaw surface abuts the workpiece in a tangential relationship.

12 Claims, 4 Drawing Sheets

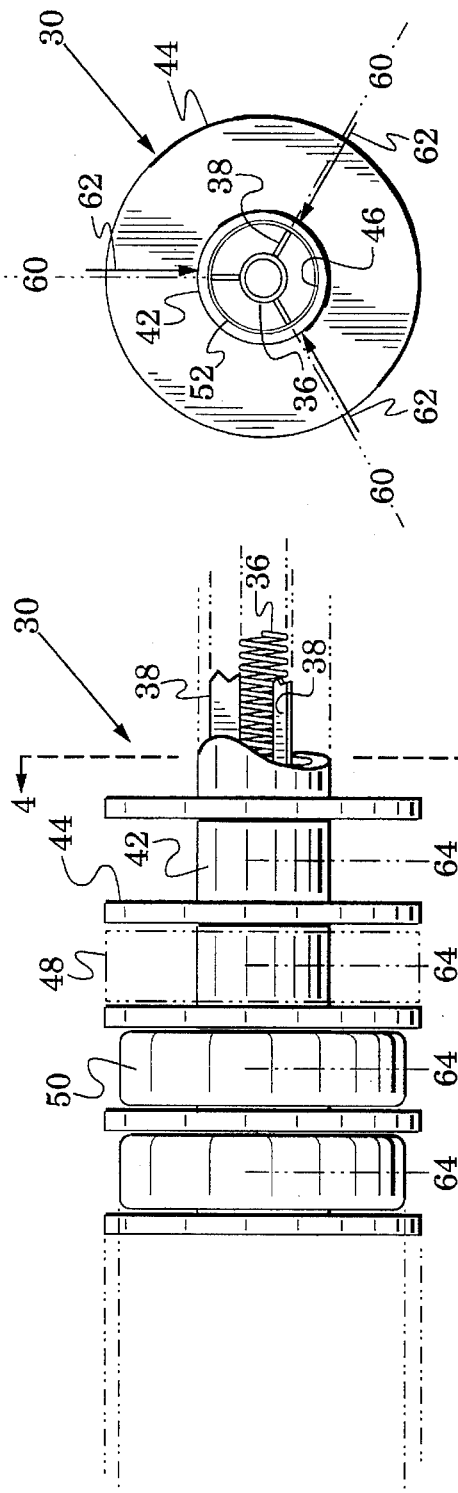
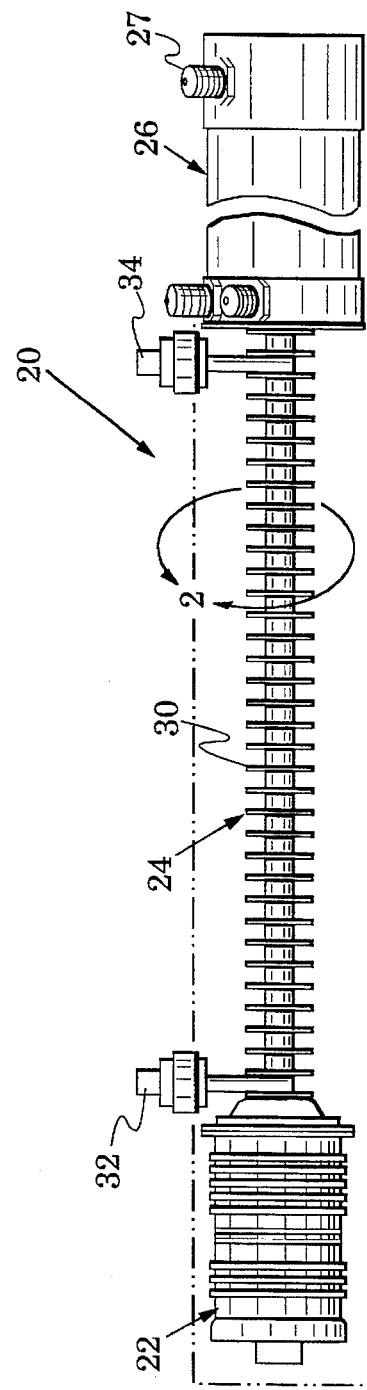
FIG. 3 (PRIOR ART)
FIG. 2 (PRIOR ART)
FIG. 1 (PRIOR ART)

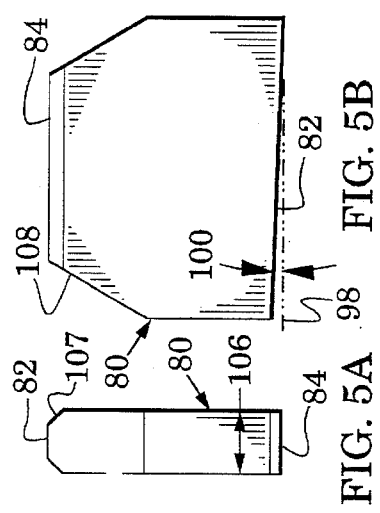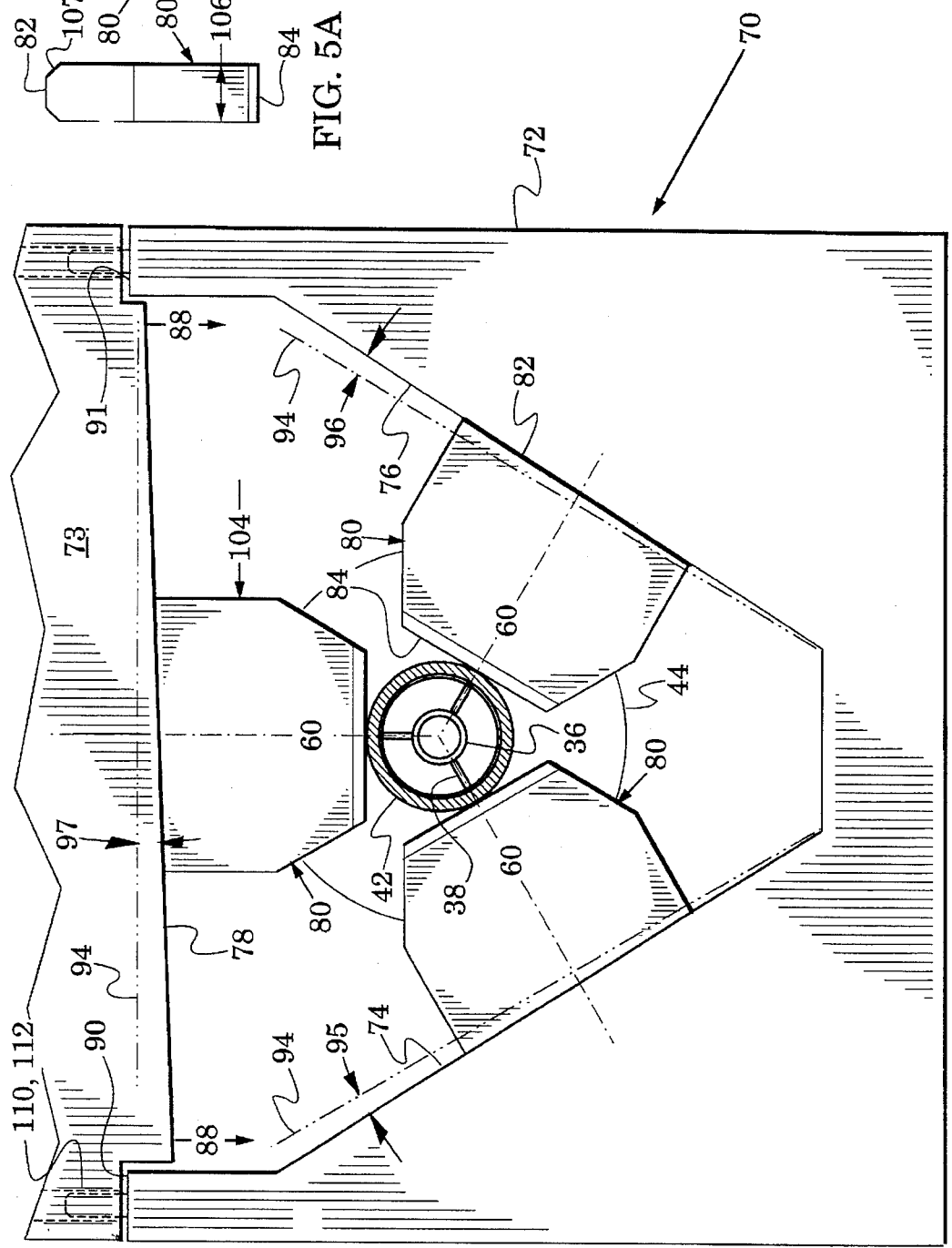
FIG. 5A  FIG. 5B
FIG. 4

DIE AND METHOD FOR APPLYING RADIAL FORCES TO AN ECCENTRIC WORKPIECE

BACKGROUND OF THE INVENTION

1. Field of the Invention

The present invention relates generally to workpiece dies and more particularly to dies which are directed to eccentric workpieces.

2. Description of the Related Art

Traveling-wave tubes (TWTs) are capable of amplifying RF signals over a considerable frequency range, e.g., 2–100 GHz. They can achieve large signal gains over broad bandwidths, e.g., >10%. They generally include a microwave slow-wave circuit and a surrounding magnetic beam-focusing structure which are both positioned between an electron gun and a collector.

In operation, a beam of electrons is launched from the electron gun into the slow-wave circuit and is guided through that circuit by the focusing structure. At the same time, an RF signal moves along the slow-wave circuit from a signal input port to a signal output port. The slow-wave circuit causes the phase velocity (axial velocity of the signal's phase front) of the RF signal to approximate the velocity of the beam's electrons. As a result, the beams are velocity-modulated into bunches which overtake and interact with the slower RF phase wave. In this process, kinetic energy is transferred from the electrons to the RF signal. After their passage through the slow-wave structure, the beam's electrons strike the collector where their remaining kinetic energy is dissipated in the form of heat.

In TWTs that are directed to applications in which power is more important than size and weight, the magnetic-focusing structure typically includes a solenoid which is wrapped around the slow-wave circuit. For ether applications, the bulky solenoid (and its power supply) are usually replaced by a periodic permanent magnet (PPM) which is formed with a series of annular, permanent magnets that are arranged so that adjacent magnets have opposite polarity.

Although there are many types of slow-wave circuits, the majority of TWTs employ a helix which is generally formed from a metal wire. In an exemplary helix TWT, the helix is supported within a barrel assembly by radially-directed support rods. The barrel assembly includes alternating segments of annular spacers and annular magnetic pole pieces. The pole pieces are made of a material, e.g., high purity iron, that efficiently channels the magnetic field to the beam region. The alternating pole pieces and spacers are brazed together to form external, annular focusing cells around an internal bore. Each of the focusing cells is configured to receive one of the annular permanent magnets. The brazed assembly must be capable of maintaining a high vacuum in the bore. Accordingly, the spacers are preferably made from a material (e.g., Monel—a nickel, copper alloy) that is nonmagnetic, can be easily brazed and has a thermal coefficient close to that of iron.

The support rods position and electrically isolate the helix within the bore of the barrel assembly. Lossy sections are typically positioned along the slow-wave circuit to enhance the TWT stability by absorbing internal power reflections. These sections are often realized with a thin carbon coating which is carried on the support rods. Consequently, the support rods are also referred to as attenuator rods.

Because of large helix voltages, the support rods must have a high dielectric strength. In addition, a considerable amount of heat is generated in the helix and, for successful TWT operation, this heat must be removed from the helix. Therefore, the support rods must also provide a good thermal conduction path. Accordingly, they are generally formed of ceramic and are tightly compressed between the helix and the bore of the barrel assembly. If this compression fails to obtain a good thermal conduction path between the support rods and the barrel assembly, the consequent heat buildup can cause degraded TWT performance or even TWT failure. Helix slow-wave circuits, support rods and magnetic focusing structures are described in numerous references, e.g., Hansen, James W., editor, *TWT/TWTA Handbook*, Hughes Aircraft Company, Electron Dynamics Division, Torrance, Calif., pp. 46–55

Several assembly methods have been developed for positioning the helix and support rods within the barrel assembly's bore. In a "heat shrink" method, the helix and support rods are joined with an adhesive, e.g., acrylic polymer, and inserted into the barrel assembly while it is at an elevated temperature. The barrel assembly is then allowed to cool to normal temperature and the consequent contraction places the support rods in compression. The adhesive is generally removed with solvents.

In a "cold stuff" assembly method, the support rods and helix are contained within a split sleeve of a strong, rigid metal, e.g., molybdenum, and physically forced (stuffed) into the bore of the barrel assembly. In a "coining" method, the support rods and helix are positioned within a copper sleeve which is then axially deformed to place the support rods into compression. The magnets and pole pieces are then assembled over the tube. In a "triangulation" method, the support rods and helix are positioned within a stainless steel sleeve which is radially deformed to place the support rods in compression. In contrast with the coining process, the deformation of the sleeve is circumferentially located between the support rods. The deformed appearance of the sleeve leads to the process name.

Therefore, TWT assembly is generally facilitated by the ability to apply radial force to the barrel assembly so as to obtain a good conductance path through the support rods. This ability can also be used as a supplemental fabrication technique at an interim assembly state. After partial assembly, TWTs are typically tested electrically to ascertain the sufficiency of the thermal path through the support rods. A drop in power at the output port immediately after the start of amplification, generally indicates a deficient thermal path. Pressure application which deforms the barrel assembly's spacers is often successful in correcting the thermal path problem.

Conventional fabrication techniques, e.g., reaming or honing, can obtain a smooth concentric bore. In contrast, the outer diameter of the spacers is relatively eccentric for several reasons, e.g., variations in spacer outer diameter, spacer misalignment prior to brazing and surface brazing remnants. When rigid structures, e.g., elongate bars, have been used to transmit radially deforming force, a low success rate has been experienced in improving the thermal path along the support rods. The low success rate has been attributed to the inability of the rigid structures to accommodate the outer diameter eccentricity of the spacers.

SUMMARY OF THE INVENTION

The present invention is directed to a die which can apply radial forces to an eccentric workpiece, e.g., the barrel assembly of a TWT. This goal is achieved with the recognition that the force can be independently applied at each intersection of n angularly-spaced radial planes of the workpiece and m axially-spaced transverse planes of the workpiece.

At each of the transverse planes: a) paths are defined which are each inclined by a respective offset angle from an orthogonal relationship with a different one of the radial planes and b) an abutment member is moved along a different one of the paths to abut the workpiece with a jaw that is inclined from the abutment member's respective path by a wedge angle which substantially equals the offset angle of that path.

In an embodiment, the paths are set by faces of die members and the abutment members are wedges which have a slide surface that is inclined from the wedge's jaw by the wedge angle. Each wedge is positioned with its slide surface against one of the die faces. Force is then applied by moving one of the die faces along one of the radial planes.

The novel features of the invention are set forth with particularity in the appended claims. The invention will be best understood from the following description when read in conjunction with the accompanying drawings.

BRIEF DESCRIPTION OF THE DRAWINGS

FIG. 1 is an elevation view of an exemplary TWT;

FIG. 2 is an enlarged view of a barrel assembly, a helix and a set of support rods within the curved line 2 of FIG. 1;

FIG. 3 is a side view of the structure of FIG. 2;

FIG. 4 is a side elevation view of a die in accordance with the present invention; the die is arranged to enclose the structure within the plane 4—4 of FIG. 2;

FIG. 5A is a side elevation view of a wedge in the die of FIG. 4;

FIG. 5B is a front elevation view of the wedge of FIG. 5A;

DESCRIPTION OF THE PREFERRED EMBODIMENTS

Figure 6:
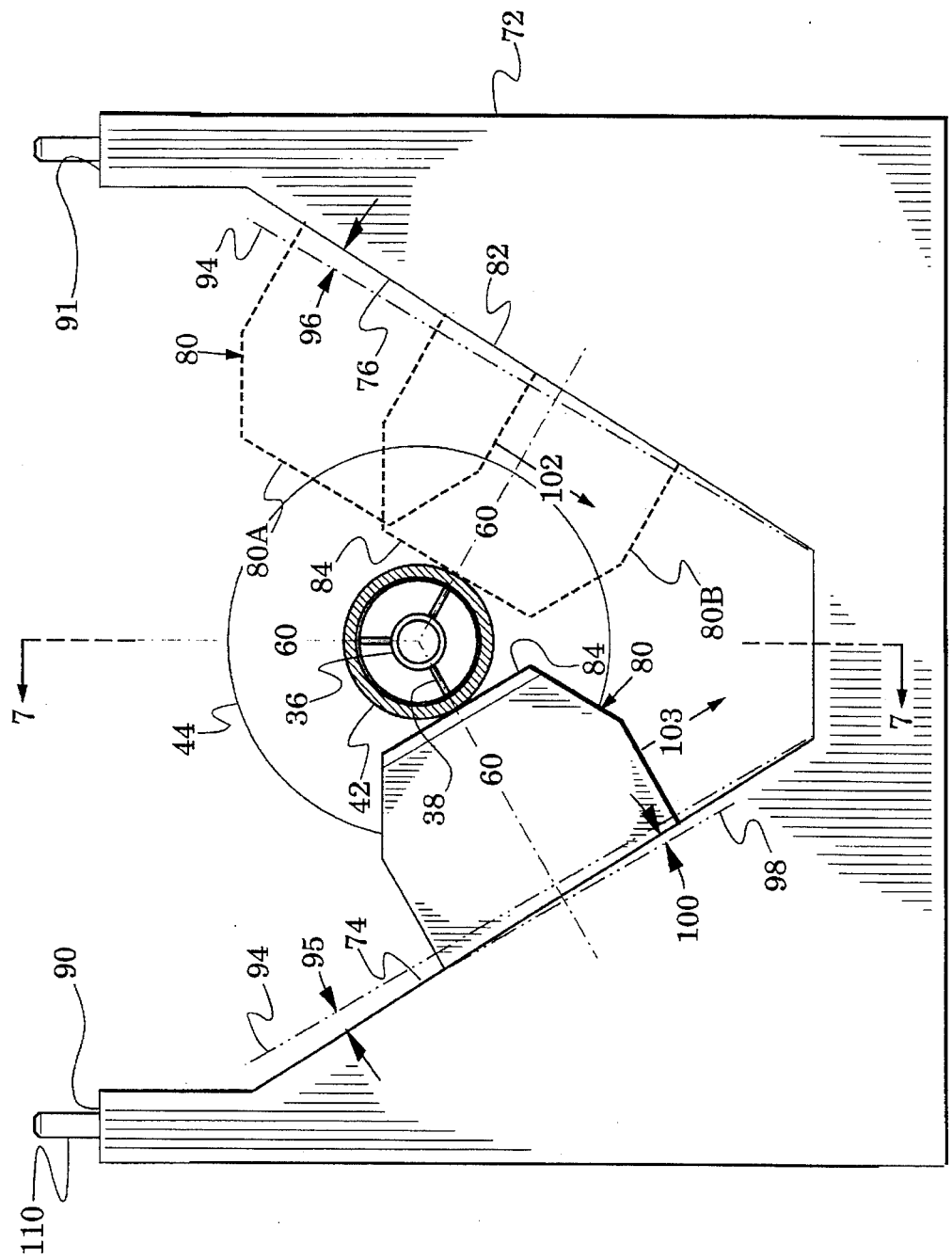
FIG. 6 is a front elevation view which shows an assembly stage of the die of FIG. 4.
Figure 7:
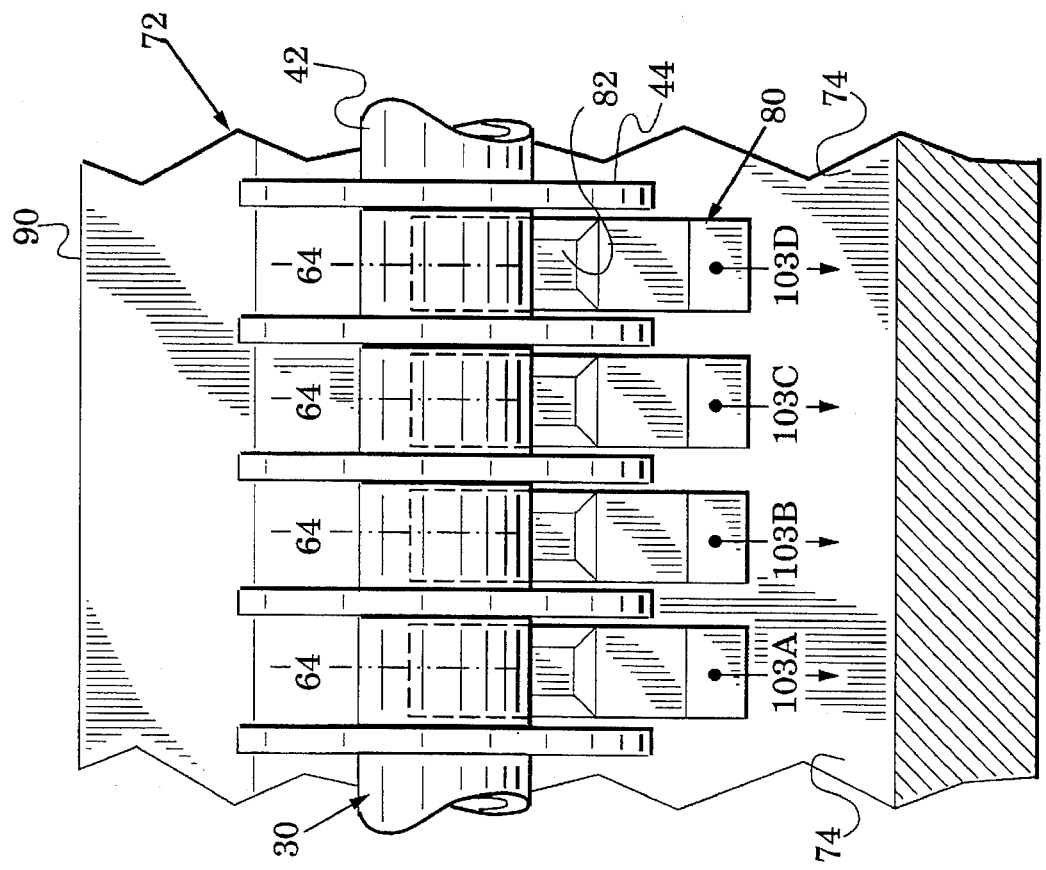
FIG. 7 is a view along the plane 7—7 of FIG. 6.

An exemplary TWT 20 is illustrated in FIGS. 1, 2 and 3. The TWT 20 includes an electron gun 22, a circuit assembly 24, a collector 26 and a protective outer case 28 (shown in broken lines for clarity of illustration). The collector 26 typically includes several internal stages to which voltage potentials are applied through insulated terminals 27. The circuit assembly 24 is positioned between the electron gun 22 and the collector 26. It includes a barrel assembly 30, an RF input port 32, an RF output port 34, a helix 36 and support rods 38. Although not shown in these views, the helix 36 is electrically connected at its opposite ends to a center conductor of the input port 32 and the output port 34. Alternating annular spacers 42 and annular magnetic pole pieces 44 are brazed together to form the barrel assembly 30.

The inner diameters of the spacers 42 and pole pieces 44 form a bore 46 and the outer surfaces of the spacers 42 and pole pieces 44 form axially-spaced, annular focusing cells 48 (shown in FIG. 2). Each of these focusing cells 48 receives an annular magnet 50 (for clarity of illustration, magnets 50 are shown only in a few cells 48 of FIG. 2). The magnets 50 are typically split to facilitate their assembly over respective spacers 42. Subsequently, they are annularly taped to retain them in their focusing cells. In some TWT configurations, the bore 46 is augmented by a sleeve 52 as indicated in FIG. 3.

In operation, an electron beam is launched from the electron gun 22 and is received in the collector 26. Between these elements, the beam is focused by the magnetic field of the magnets 50 so that it follows a path through the helix 36. An RF signal is inserted at the input port 32 and travels along the helix 36. The signal is amplified by interaction with the electron beam and exits through the output port 34.

This process is accompanied by energy dissipation in the helix 36. This dissipation increases as the signal and beam interaction proceeds along the helix 36. It reaches a maximum adjacent the output port 34. The resulting heat is conducted away from the helix 38 along a conduction path which includes the support rods 38, the spacers 42 and the pole pieces 44. Typically, to enhance this conduction path, the support rods are made of various ceramics, e.g., boron nitride, aluminum oxide or beryllium oxide, and the iron pole pieces are coated with copper. To further enhance heat conduction, the support rods 38 are placed in compression between the helix 36 and the bore 46 of the barrel assembly 30. If this compression is not adequately achieved, the thermal path is degraded at the contacts between the edges of the support rods 38 and the helix 36 and bore 46.

A conventional method of placing the helix in compression is to apply force to the spacers 42 so as to slightly deform them inward. This force is preferably applied in the planes of the support rods 38 so that the diameter of the bore 46 is slightly diminished where it contacts the support rods. The result is the same as though the helix 36 and support rods 38 had been forced into a smaller diameter bore. The deformed bore urges inward upon the support rods 38 to keep them in compression.

Achieving this deformation is complicated by the fact that the outer diameters of the spacers 42 are generally eccentric. One source of this eccentricity is the initial fabrication variation in the outer diameter of the spacers 42. Other sources include misallignment of the spacers prior to brazing, heat distortion caused by the brazing operation and surface remnants of the brazing operation.

FIG. 3 illustrates that the distorting force, on each spacer 42, is preferably applied along radial planes 60 which are extensions of the support rods 38. The force is indicated by inwardly-directed force arrows 62 (the force arrows are slightly spaced from their respective planes 60 for clarity of illustration). These radial forces 62 should be applied along each of the axially-spaced transverse planes 64 in FIG. 2 that indicate the center of the focusing cells 48. That is, the forces 62 are applied at each intersection of the angularly-spaced radial planes 60 and the axially-spaced transverse planes 64 and, to achieve good thermal conductivity, the force application must be able to accommodate the somewhat eccentric outer diameters of the spacers 42. At each of the transverse planes 64, the force is preferably applied over the entire axial span of that plane's spacer 42.

Attention is now directed to FIGS. 4–7, which illustrate a die 70 in accordance with the present invention. The die 70 is directed to the application of force to an eccentric workpiece such as the barrel assembly 30 of FIGS. 1–3. To illustrate the die 70, FIG. 4 includes the barrel assembly structure along the plane 4—4 of FIG. 2.

The die 70 has a pair of die members 72 and 73 which, together, define three faces 74, 76 and 78. An abutment member in the form of a wedge 80 is positioned on each of these faces. Each wedge has a slide surface 82 which is in contact with a different one of the faces 74, 76 and 78. Each wedge also has a jaw surface 84 which is in contact with the spacer 42. In particular, the jaw surfaces 84 are tangent to the spacer 42 at each of the radial planes 60.

Therefore, when the die members 72 and 73 are pressed together (as indicated by the movement arrows 88 of the member 73), force will be applied along each plane 60 to deform the spacer 42. The movement 88 can be limited to a predetermined distance by stops 90 and 91 on the die member 72. The die 70 is configured so that the visible structure in FIG. 4 is repeated along each of the transverse planes 64 that run through the annular focusing cells 48 of FIG. 2. That is, a set of wedges 80 are positioned, in the manner of FIG. 4, along each transverse plane 64. One of the wedges of each set can be seen in the sectional view of FIG. 7.

The tangential relationship between the jaw surfaces 84 and the various spacers 42 can be realized in each of the transverse planes even though the outer diameters of the spacers 42 are eccentric. This feature of the invention is achieved because each of the wedges 80 has a wedge angle that substantially matches an offset angle of its respective face. These two angles will now be described.

FIG. 4 shows broken lines 94 which represent planes that are each orthogonal to a different one of the radial planes 60. Each of the faces 74, 76 and 78 is inclined from a respective one of the orthogonal planes 94 by a respective offset angle 95, 96 or 97, i.e., inclined by a respective offset angle 95, 96 or 97 from an orthogonal relationship with a different one of the radial planes 60. FIG. 5B shows a broken line 98 which represents a plane that is parallel with the jaw surface 84. The slide surface 82 is inclined from the parallel plane 98 by a wedge angle 100, i.e., it is inclined by a wedge angle 100 from the jaw surface 84. The wedge angle 100 of each of the wedges 80 in FIG. 4 substantially equals the offset angle of its respective face. Therefore, as each wedge 80 is moved along its respective face, its jaw surface 84 will always be parallel with the orthogonal plane 94 that is associated with that face. When the jaw surface 84 is moved into an abutting relationship with the spacer 42, it is consequently tangent with the spacer along one of the radial planes 60.

This wedge movement is more clearly seen in FIG. 6 which shows one stage in the installation of the wedges 80. A first wedge 80 has been positioned between the face 74 and the spacer 42 and oriented so that its wedge angle 100 cancels the offset angle 95 of the face 74. Because of this cancellation, the plane 98 (from FIG. 5B) and the jaw surface 84 of this wedge are parallel with the respective plane 94 and, therefore, orthogonal to the respective axial plane 60. That is, the taper of the wedge 80 allows it to find a point of tangency to the spacer 42 that is orthogonal to a ray from the center of the spacer.

A second wedge 80 is similarly oriented on the face 76. It is initially placed at position 80A and then moved along the movement arrow 102 to a position 80B where its jaw surface 84 abuts the spacer 42. Because the face 76 is inclined from the orthogonal plane 94 by the offset angle 96, the jaw surface 84 moves inward along the respective radial plane 60 as the second wedge moves from position 80A to position 80B. This inward radial movement causes the spacer 42 to be in tangential contact with the jaw surfaces 84 of the first and second wedges 80. A similar, initial wedge movement 103 is indicated in FIG. 6 for the first wedge. A final wedge movement that brings the upper wedge 80 of FIG. 4 into tangential contact is indicated by the movement arrow 104. Thus, the planes 74, 76 and 78 define paths for the abutment members (wedges) 80 to move along as they approach and abut the workpiece.

As mentioned before, the outer diameters of the spacers 42 of the barrel assembly (30 in FIGS. 1-3) are slightly eccentric. This eccentricity will cause the outer diameters of the spacers 42 to have different radial positions in different transverse planes (64 in FIGS. 2 and 7). This radial difference is accommodated by variations in the wedge movements 102, 103 and 104 of each wedge set. For example, in FIG. 7 each of the wedges 80 is shown to have a different movement arrow 103A, 103B, 103C and 103D to indicate that each wedge can move a different distance along its plane 74 to accommodate the eccentricity of the spacers 42.

FIGS. 5A and 5B illustrate that each wedge 80 also has a width 106 and corner chamfers 107 and 108. The width 106 is selected for insertion into each focusing cell 48 of FIG. 2. This insertion is facilitated by the chamfers 107. The chamfers 108 are dimensioned to avoid contact between neighboring wedges.

Although the teachings of the invention do not require it, the offset angles 95, 96 and 97 are equal in the die embodiment 70 of FIG. 4. Consequently, in this embodiment only one wedge angle 100 is required and all wedges have the same dimensions, i.e., only one wedge type need be fabricated. As shown in FIG. 6, movement of a wedge 80 along its respective face causes axial movement along its axial plane 60. This axial movement must be sufficient to bring the jaw surface 84 into abutment with the spacer 42. The offset angle is selected to be large enough to insure that this axial movement is sufficient. Conversely, the offset angle should be small enough to prevent slippage between the slide surface 82 and its respective face when the die members 72 and 73 are pressed together. The offset angle should generally be less than 10° and is an exemplary 2° in the embodiment 70 of FIG. 4.

FIG. 4 indicates that the offset angle inclination of one of the faces 74, 76 and 78 is in the opposite direction from that of the other faces. The faces 74 and 78 are inclined counterclockwise and the face 76 is inclined clockwise. This facilitates the positioning of the wedges 80 on the faces 74 and 76. They can be essentially dropped into position because gravity will cause them to wedge their respective jaw surfaces 84 against the spacer 42. The upper wedge can then be slid along the face 78 from right to left as indicated by the movement arrow 104 until it wedges between that face and the spacer 42.

With respect to FIG. 5B, it was stated above that the slide surface 82 is inclined from the parallel plane 98 by a wedge angle 100. It would be equivalent for the jaw surface 84 to be inclined by the same wedge angle from a plane which is parallel with the slide surface 82. Thus, in FIG. 4 each jaw surface 84 is inclined from a path that is defined by a respective one of the faces 74, 76 and 78.

Although the die embodiment 70 of FIGS. 4-7 has three faces which facilitate the application of force to three radial workpiece planes, it should be understood that this is an exemplary embodiment and that, in general, the invention is directed to n faces and the use of n×m abutment members to apply force at the intersection of n radial workpiece planes and m transverse workpiece planes.

The teachings of the invention have been described with reference to a generally cylindrical workpiece. The teachings may be extended, in general, to any workpiece by replacing the radial planes 60 of FIGS. 3, 4 and 6 with planes that are locally orthogonal to the workpiece surface, or alternatively, by replacing the planes 94 of FIG. 4 with planes that are locally tangent to the workpiece.

In the embodiment 70, the wedges 80 are positioned by movement between their slide surface 82 and the respective die face (74, 76 and 78 in FIG. 4). Other embodiments of the invention may realize this movement in any way that is well known in the die art. For example, the wedges may move along tracks or slots or the movement facilitated with rollers or balls. The die members (72, 73 in FIG. 4) can be pressed together with conventional pressure means of the die art, e.g., hydraulic pressure, screw pressure, air pressure, clamps, and with conventional alignment techniques, e.g., the pins 110 and receiving holes 112 shown in FIGS. 4 and 6.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A die for applying force along each intersection of n angularly-spaced, radial planes and m axially-spaced, transverse planes of a generally cylindrical workpiece, comprising:

n substantially equilangularly-spaced faces defined by at least two die members, said faces spaced apart to receive said workpiece between them and each inclined by a respective offset angle from an orthogonal relationship with a different one of said radial planes; and n×m wedges, each having a slide surface configured to slide over one of said faces when positioned substantially at a different one of said intersections and a jaw surface that is inclined from said slide surface by a wedge angle which substantially equals the offset angle of that wedge's respective face;

wherein said die members are configured to allow one of said faces to move along one of said radial planes.

2. The die of claim 1, wherein the offset angles of said faces are substantially equal.

3. The die of claim 1, wherein said offset angles are less than 10 degrees.

4. The die of claim 1, wherein n=3.

5. A method of applying force along each intersection of n angularly-spaced, radial planes and m axially-spaced, transverse planes of a generally cylindrical workpiece, comprising the steps of:

positioning an abutment member adjacent each of said intersections;

and, in each of said transverse planes;

a) defining n paths which are each inclined by a respective offset angle from an orthogonal relationship with a different one of said radial planes;

b) moving each abutment member along a different one of said paths;

c) abutting said workpiece with a jaw surface of each abutment member that is inclined from its respective path by a wedge angle which substantially equals the offset angle of that path; and d) urging each abutment member along its respective radial plane.

6. The method of claim 5, wherein said offset angles are substantially equal.

7. The method of claim 5, wherein said offset angles are less than 10 degrees.

8. The method of claim 5, wherein n=3.

9. A method of fabricating a traveling-wave tube, comprising the steps of:

joining a plurality of annular spacers and a plurality of magnetic pole pieces in an alternating relationship to form a barrel assembly with an internal bore and with a plurality of annular focusing cells along axially-spaced transverse planes of the barrel assembly;

positioning a helix in said bore;

positioning n support rods along n radial planes between said helix and said bore;

positioning an abutment member adjacent each intersection of said radial planes and said transverse planes;

defining n paths which are each inclined by a respective offset angle from an orthogonal relationship with a different one of said n radial planes;

in each transverse plane, a) moving each of the abutment members of that transverse plane along a different one of said paths;

b) abutting the spacer in that transverse plane with a jaw surface of each abutment member that is inclined from its respective path by a wedge angle which substantially equals the offset angle of that path; and c) urging the abutment members of that transverse plane along their respective radial plane to compress said support rods;

positioning annular magnets in said focusing cells;

coupling an input port and an output port to opposite ends of said helix; and spacing an electron gun and a collector from opposite ends of said helix.

10. The method of claim 9, wherein said offset angles are substantially equal.

11. The method of claim 9, wherein said offset angles are less than 10 degrees.

12. The method of claim 9, wherein n=3.

* * * * *